United States Patent [19]

Yu

[11] Patent Number: 5,860,155
[45] Date of Patent: Jan. 12, 1999

[54] INSTRUCTION DECODING MECHANISM FOR REDUCING EXECUTION TIME BY EARLIER DETECTION AND REPLACEMENT OF INDIRECT ADDRESSES WITH DIRECT ADDRESSES

[75] Inventor: Kuo Cheng Yu, Hsinchu, Taiwan

[73] Assignee: Utek Semiconductor Corporation, Hsinchu, Taiwan

[21] Appl. No.: 947,445

[22] Filed: Sep. 30, 1997

Related U.S. Application Data

[63] Continuation of Ser. No. 558,531, Nov. 16, 1995, abandoned.
[51] Int. Cl.[6] .................................................. G06F 9/35
[52] U.S. Cl. ........................ 711/220; 711/214; 395/381
[58] Field of Search ................................ 711/214, 220; 395/381

[56] References Cited

U.S. PATENT DOCUMENTS 4,354,231  10/1982  Carlsson et al. .................... 395/375
4,439,828   3/1984  Martin ............................... 395/375
4,907,147   3/1990  Saito et al. ......................... 364/200
5,239,633   8/1993  Terayama et al. ................... 395/375
5,247,639   9/1993  Yamahata ........................... 395/465

Primary Examiner—Eddie P. Chan
Assistant Examiner—Kevin Verbrugge
Attorney, Agent, or Firm—W. Wayne Liauh

[57] ABSTRACT

The mechanism includes a virtual address detecting circuit for detecting the virtual address of the instruction code. When a virtual address is detected, an indicating signal is generated, which is then sent to an indirect address register to register the indirect address of the instruction code. Thereafter, an indirect address replacing circuit is used to decode and replace the indirect address registered in and sent from the indirect address register with a direct address. In the absence of the virtual address, the direct address is allowed to pass through the indirect address replacing circuit.

5 Claims, 4 Drawing Sheets

INSTRUCTION DECODING MECHANISM FOR REDUCING EXECUTION TIME BY EARLIER DETECTION AND REPLACEMENT OF INDIRECT ADDRESSES WITH DIRECT ADDRESSES

This is a continuation of U.S. Ser. No. 08/558,531, filed on Nov. 16, 1995 now abandoned.

BACKGROUND OF THE INVENTION

FIELD OF THE INVENTION

The present invention relates to an instruction decoding mechanism for reducing the execution time of a microprocessor, and more particularly, to a mechanism for reducing execution time of a microprocessor during addresses decoding by means of earlier detection, and the subsequent replacement, of indirect addresses with direct addresses.

According to the conventional addressing method of a microprocessor, the indirect addressing method thereof is to be done by using an indirect register (such as an index register) and a data register (such as a data block register) to obtain an actual address for instruction decoding. The actual address is substantially the sum of the implied value of the data register and the value stored in the indirect register. Therefore, when performing data access, some storage space in the data register must be taken, and a considerable time will be wasted.

The indirect address register and the virtual addressing approach are derived from the known method of memory mapping I/O, and may be applied to various functional registers, such as a timer/counter, an interrupt control register, and an I/O register. The mapping method is widely used in various commercially available microprocessors, such as Motorola M68000 series and Intel 8051 series microprocessors. Particularly, such method is mostly used in the microcontroller for control purpose, and its advantages are as follows:

(1). When a register address uses a memory address, no additional circuit upon designing a special register is required for decoding operation; i.e., it requires only the circuit of the original memory for decoding without having to provide additional instruction and instruction-decoding circuits. Therefore, such method can simplify the IC considerably.

(2). In a micro-controller and a micro-processor, there are more operation requirements to the aforesaid special register. For example, when a bit data operation for an I/O port is executed, such as setting or clearing the data of a bit, such circuits used in the special register and the memory may only be used for the special register, which will limit the functions of the system. On the contrary, if the special register and the memory address are used together, the efficiency and the functions of the system may be increased considerably.

FIG. 1 is a timing sequence according to the prior art decoding method. The conventional processes mainly includes steps of a fetching cycle, a decoding cycle, and an executing cycle in sequence. The fetching cycle is indicated by FETCH, the decoding cycle is indicated by DECODE, and the executing cycle is indicated by EXECUTION.

In the fetching cycle, the instruction code is read at first. The instruction code or operation code is a portion of a machine language or assembly language instruction that specifies the type of the instruction (that is, what kind of operation the instruction performs) and the structure of the data upon which it operates.

The fetched instruction code is decoded by either direct addressing mode or indirect addressing mode. In the indirect addressing operation mode, the real address is necessary to be further counted. The execution cycle includes steps of reading register value, performing operation, and writing back the data to the register.

As described above, the instruction decoding cycle may be achieved either by direct addressing mode or indirect addressing mode. Typically, the instruction decoding operation may be completed by means of the pipeline decoding approach. The operation of the pipeline decoding approach may be performed by two types as follows:

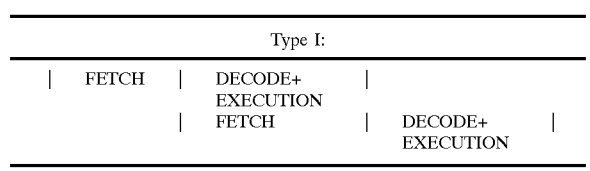

In the above case, the time required for DECODE and EXECUTION will limit the functions of the microprocessor.

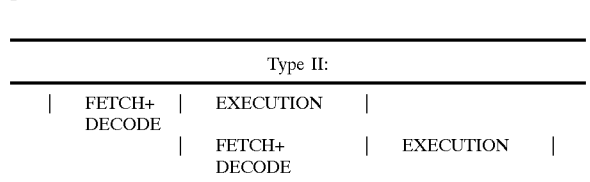

In this later case, all signals after DECODE must be recorded for EXECUTION use.

The conventional addressing mode and the instruction operation method usually can provide a powerful function; the circuit required by a more complex instruction would be more difficult to design, and would require longer designing time. In other words, it would be much difficult to use the Pipeline and Super scale technique to increase the functions. Therefore, an idea of RISC (Reduced Instruction Set Computer) has been proposed so as to cause the instructions of complex functions to be divided into the most simple instructions by means of statistics and analysis. Because of simplicity, such configuration can provide a higher efficiency, can be modified easily, and can be arranged in a regular order. Therefore, the pipeline and super scale technique can be used easily to provide a higher function.

The present invention is deemed to conform to the aforesaid simplicity in terms of changing instructions, i.e., the time sequence order can easily be used for the pipeline technique to increase the efficiency of the system. The aforesaid advantages cannot be provided by the conventional instruction decoding; such replacing method is deemed having industrial value in the field of developing high-efficiency microprocessor.

SUMMARY OF THE INVENTION

This invention relates to a method for replacing indirect address with direct address, and particularly to a method for reading and writing an actual register after obtaining an actual address code by means of a virtual address and an indirect register connected lines, and through an address code replacing process.

The main object of the present invention is to provide an efficient indirect addressing method, i.e., to allow the read and write of data to be performed with the method of the present invention without wasting the data register storage space and the operation time. One of the main features of the method disclosed in the present invention is that it can read and write a virtual address by means of an indirect address register, i.e., being able to read and write an actual register designated through an indirect address register.

The method for replacing indirect addressing according to the present invention is different from the conventional instruction decoding method because of the instructions used involve all direct addressing instruction. With the method disclosed in the present invention, the indirect addressing mode is modified to have an virtual address, such as 00H, to be included into the actual address before the performing the instruction decoding. Therefore, the design for the operation and the control element in the microprocessor have been simplified, in that only direct addressing mode is involved.

The advantages of the present invention are as follows:

(1). The instruction compilation need not distinguish direct addressing instruction and indirect addressing instruction; in other words, the same number of instructions can provide versatile instructions upon encoding instructions, and all such instructions can provide the functions of direct addressing and indirect addressing, i.e., without reducing the addressing functions upon the instructions being increased.

(2). Since the instructions do not distinguish between the direct addressing instruction and the indirect addressing instruction, the instruction-decoding circuit can be made to be substantially more simplified than the conventional circuit.

(3). Regarding the time sequence, the present invention is deemed to have better flexibility than that of the conventional decoding circuit.

(4). By using the virtual address, such as hexadecimal number 00H as the method of judging the indirect address, the code 00H is deemed to have the advantages of easy identification and replacing; it can simplify both the design circuit and the actual circuit. Since such address can only occupy the starting address of the memory, it would have very little effect on the integrity of the memory.

DETAIL DESCRIPTION OF THE PREFERRED EMBODIMENT

Figure 1:
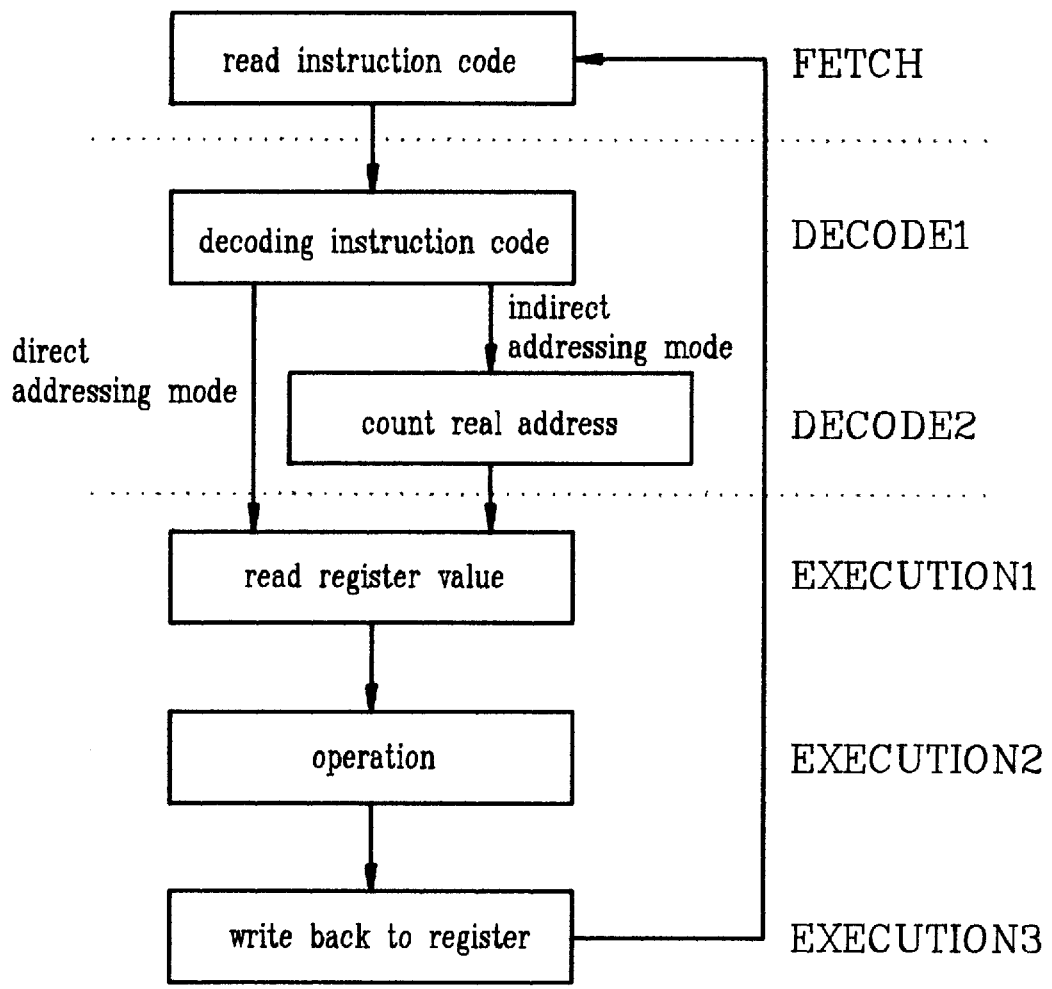
FIG.1 is a timing sequence according to the prior art decoding method.
Figure 2:
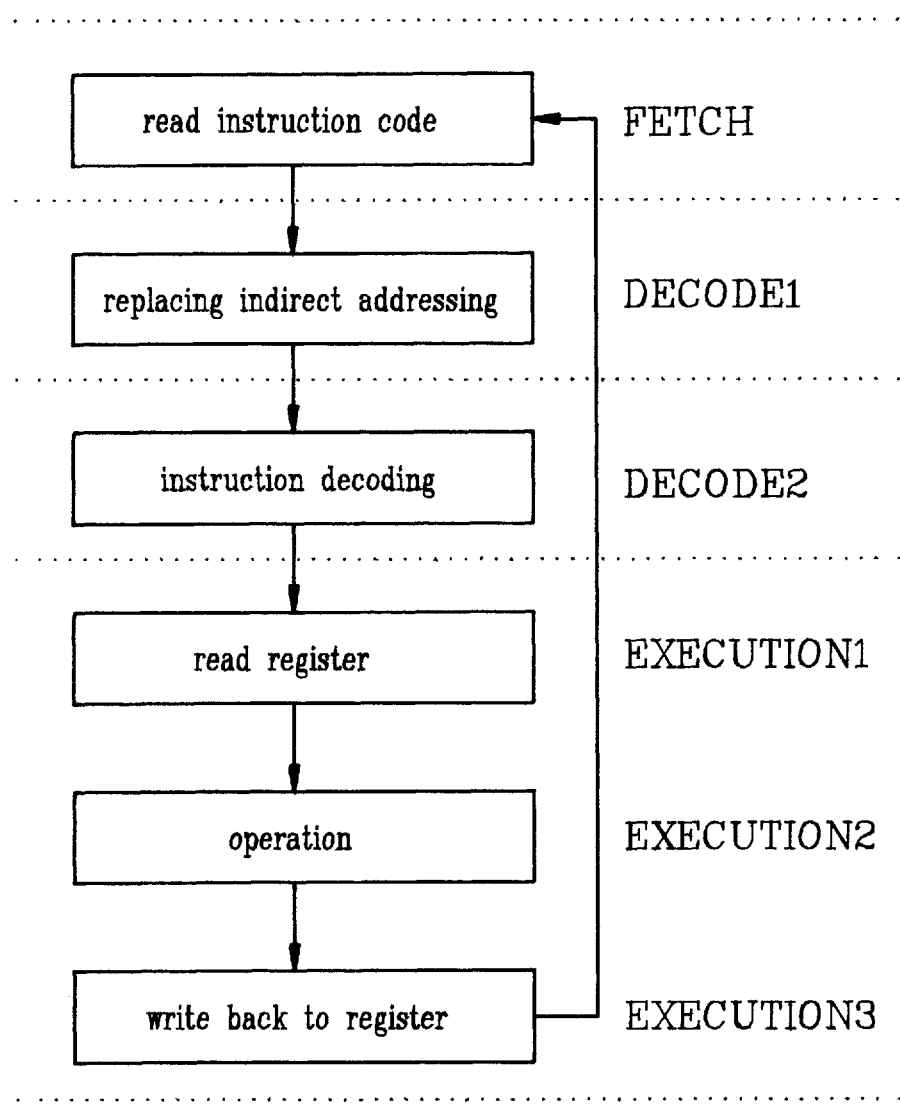
FIG.2 is the decoding method of the present invention.
Figure 3:
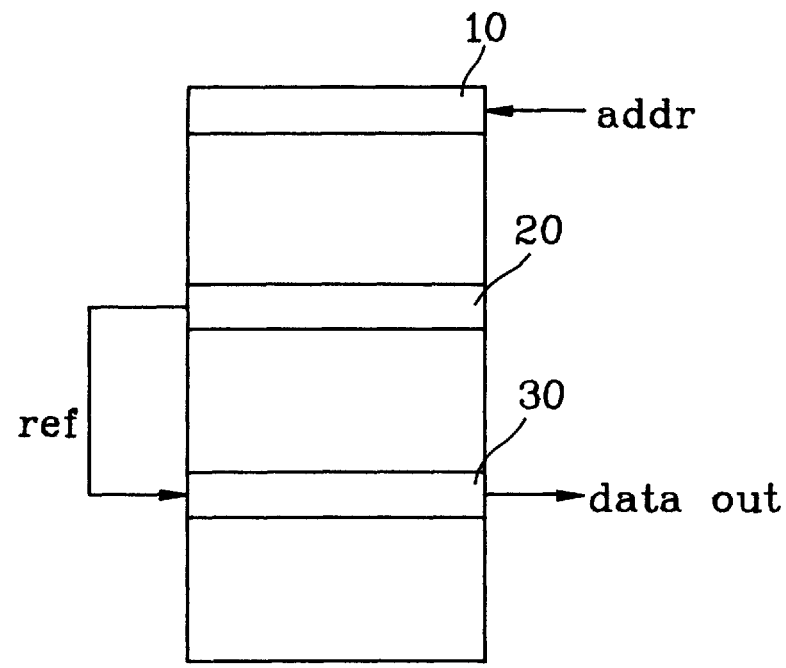
FIG.3 is a diagram of an embodiment according to the present invention, showing a method for replacing indirect addressing.

Referring to FIG.3, which shows a diagram of the method for replacing indirect addressing comprises a virtual address region 10, an indirect address register 20, and an actual register 30. An address signal (addr) is coupled into the virtual address region 10, and it will pass through the reference relation (ref) between the indirect address register 20 and actual register 30.

A data will be sent out through "data out", that is the actual address. In fact, the aforesaid "ref" is done through a series of circuits of detection and conversion.

Figure 4:
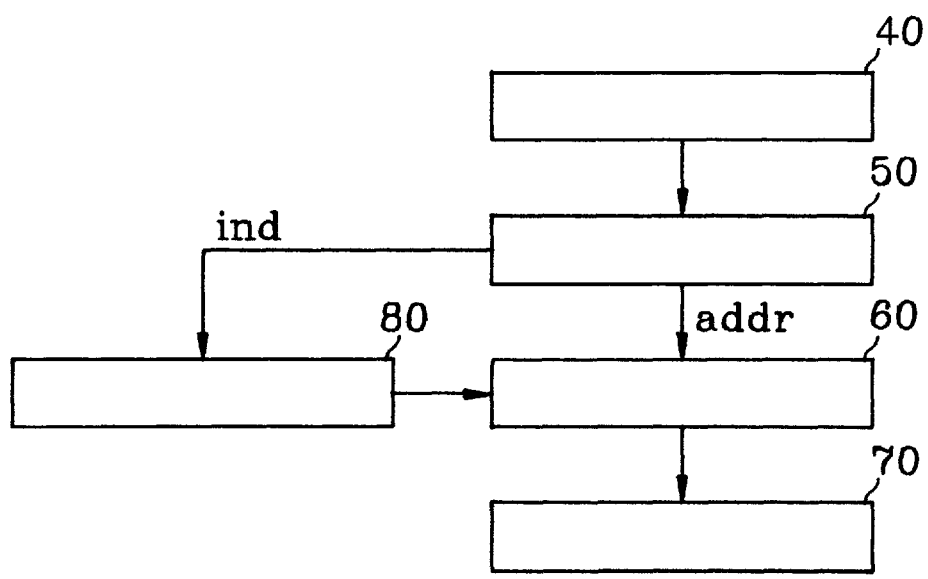
FIG.4 is a flow chart of the embodiment according to the present invention.

Referring to FIG.4, there is shown a flow chart of the present invention. During fetching an instruction code 40 in a microprocessor, the instruction code 40 will be sent into a virtual address detecting circuit 50 to find out whether the instruction code is an indirect address or a direct address. In case that the instruction code is a direct address, the address signal (addr) will be sent to an address code replacing circuit 60, and then sent to an actual address register 70 . In such a case, the address signal will be treated as an actual address.

On other hand, in case that the instruction code is an indirect address, the virtual address detecting circuit 50 will generates an indicating signal (ind) to an indirect address register 80. The output terminal of the indirect address register 80 is connected with the address code replacing circuit 60 for decoding so as to obtain an actual address 70.

The virtual address detecting circuit 50 includes an indicating signal generating circuit for generating the indicating signal (ind). According to the embodiment of the present invention, hexadecimal number 00H is used as the virtual address, and the virtual address detecting circuit 50 can be simplified into a NOR gate with multiple input terminals as shown in FIG.5.

Figure 6:
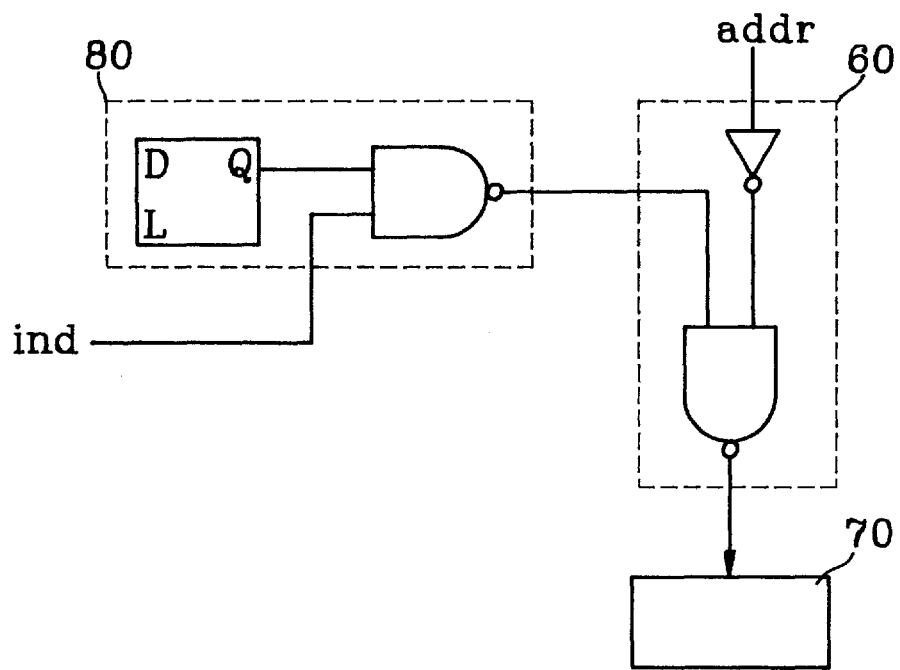
FIG.6 is a brief circuit of the indirect address register and the address code replacing circuit in the embodiment according to the present invention.

FIG.6 is a logic diagram further illustrating the logic circuit of the indirect address register 80 and the address code replacing circuit 60 shown in FIG.4. The indirect address register 80 includes a D-type flip-flop and a NAND gate. One input terminal of the NAND gate is coupled to the output terminal of the D-type flip-flop. The other input terminal of the NAND gate is coupled to the output of the virtual address detecting circuit 50 for receiving the indicating signal (ind) generated by the virtual address detecting circuit 50.

The address code replacing circuit 60 includes an inverter and a NAND gate. The address signal (addr) of the instruction code is supplied to one input terminal of the NAND via the inverter. The output signal of the indirect address register 80 is supplied to the other input terminal of the NAND.

Figure 5:
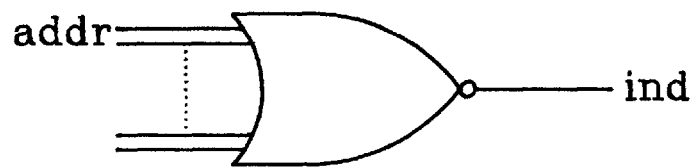
FIG.5 is a brief virtual address detecting circuit in the embodiment according to the present invention.

When the address signal (addr) of the fetched instruction code is 00H, i.e. the address of the fetched instruction code is virtual address, the output terminal of the NOR gate as shown in FIG.5 will send an indicating signal (ind) with logic high state to the indirect address register 80 so that the indirect address is replaced with direct address. In such operation, an actual address may be obtained from the actual address register 70.

It is noted from the decoding operation described above, the addressing mode during decoding cycle is completely operated in direct addressing mode. The indirect address is replaced with actual address by an earlier detection and replacement of indirect address with direct address. The decoding flow diagram of the present invention can be applied to two-level pipeline decoding approach as the following two types:

| Type I: | | |
|---|---|---|
| FETCH+ DECODE1 | DECODE2+ EXECUTION | |
| | FETCH+ DECODE 1 | DECODE 2+ EXCUTION |

When the time of DECODE and EXECUTION limits the functions of the whole microprocessor, the DECODE 1 can be put in the FETCH CYCLE.

| Type I: | | | | |
|---|---|---|---|---|
| FETCH | DECODE+ EXECUTION | | | |
| | FETCH | | DECODE+ EXECUTION | |

In the event of FETCH time being too long (longer than sum of DECODE and EXECUTION), the DECODE 1 and DECODE 2 may be combined together and put in the EXECUTION CYCLE.

In summary, the key features of the present invention include the use of the virtual address and the novel circuit. When the presence of the virtual address is detected, the indirect address is registered (stored) in the indirect address register, with a flip-flop. The address code replacing circuit then decodes the indirect address registered in the indirect address register to output the actual direct address. In the absence of the virtual address, the address code replacing circuit allows the address signal, which is a direct address, to pass therethrough.

It is apparent that although the invention has been described in connection with a preferred embodiment, those skilled in the art may make changes to certain features of the preferred embodiment without departing from the spirit and scope of the invention as defined in the appended claims.

I claim:

1. An apparatus for decoding an instruction code of a microprocessor, comprising:
   (a) means for reading an instruction code, which is structured to include a virtual address signal coupled with an address signal, wherein said address signal can be either a direct address or an indirect address and said virtual address signal is provided such that its presence indicates that said address signal contained in the instruction code is an indirect address and that its absence indicates that said address signal contained in the instruction code is a direct address;
   (b) a virtual address detecting circuit for receiving said instruction code and detecting the presence of said virtual address signal in said instruction code;
   (c) means provided in said virtual address detecting circuit for generating an indicating signal when said virtual address signal is detected;
   (d) an indirect address register connected to said virtual address detecting circuit for registering an indirect address when said indicating signal is received; and
   (e) an address code replacing circuit, which is connected to both said virtual address detecting circuit to receive the address signal and said indirect address register to receive output from said indirect address register, said address code replacing circuit is structured such that it will
      (i) in the absence of said virtual address signal, allow said address signal, which is a direct address, to pass therethrough; and
      (ii) in the presence of said virtual address signal, decode said indirect address registered in said indirect address register, and replace it with a corresponding direct address.

2. The apparatus as claimed in claim 1, wherein said virtual address detecting means comprises a NOR gate with multiple input terminals.

3. The apparatus as claimed in claim 1, wherein said virtual address is hexadecimal number 00H.

4. The apparatus as claimed in claim 1, wherein said indirect address register comprises a D-type flip-flop with an output and a NAND gate with two input terminals, one input terminal of the NAND gate being coupled to the output terminal of the D-type flip-flop, and the other input terminal of the NAND gate being coupled to the virtual address detecting circuit for receiving the indicating signal generated by the virtual address detecting circuit.

5. The mechanism as claimed in claim 1, wherein the indirect address replacing means comprises an inverter and a NAND gate with two input terminals, the instruction code being supplied to one input terminal of the NAND via the inverter, and the output signal of the indirect address register is supplied to the other input terminal of the NAND.

* * * * *